United States Patent [19]

Toy et al.

[11] 3,901,733
[45] Aug. 26, 1975

[54] THIN FILM SOLID ELECTROLYTE STRUCTURES AND PROCESS OF MAKING SAME

[75] Inventors: Albert Toy, Gardena; Neal A. Richardson, Palos Verdes Peninsula; Robert Bromberg, Los Angeles, all of Calif.

[73] Assignee: TRW Inc., Redondo Beach, Calif.

[22] Filed: Oct. 7, 1974

[21] Appl. No.: 512,750

[52] U.S. Cl.............. 136/153; 106/13.4; 106/40 R; 117/93.3; 117/106 R
[51] Int. Cl...................... H01m 11/00; B01k 3/12
[58] Field of Search ...... 136/153, 83 R, 83 S, 6 SA, 136/106

[56] References Cited
UNITED STATES PATENTS
3,625,773  12/1971  Charles.............................. 136/153
3,859,427  1/1975  Francis.............................. 136/153

*Primary Examiner*—John H. Mack
*Assistant Examiner*—H. A. Feeley
*Attorney, Agent, or Firm*—Daniel T. Anderson; Alan D. Akers; Willie Krawitz

[57] ABSTRACT

Thin film solid electrolyte structures are made by applying dense coating of ceramic ionic conductor such as β-alumina sodium polyaluminate to a substrate of a porous β-alumina or other sodium polyaluminate compounds and sintering the composite structure whereby a thin impermeable β-alumina film is formed on the porous support sturcture. The integral unit is a solid electrolyte consisting of a thin film ionic conductor supported by a porous substrate which is also an analyte reservoir.

19 Claims, 1 Drawing Figure

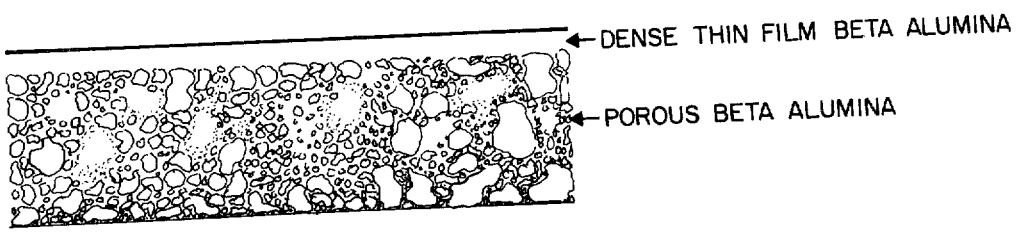

THIN FILM SOLID ELECTROLYTE STRUCTURES AND PROCESS OF MAKING SAME

BACKGROUND OF THE INVENTION

Solid electrolyte batteries have attracted recent attention because of their high energy density, high power density, and infinitely long storage life. Typically, in the Na/S solid electrolyte battery, β-alumina is the solid electrolyte, sodium metal is the anode material, and sulfur is the cathode material. When molten sodium metal is placed on one side of the solid electrolyte and sulfur is placed on the other side of the barrier, a circuit is completed when the battery or cell is connected to a conventional external resistance. The β-alumina solid electrolyte, being an ionic conductor and separator, allows a current flow and electrode processes to occur on both sides of the separator without mixing of the anodic and cathodic reactants. Details of the formulations and preparation of these sodium aluminate compounds (β-alumina included) may be obtained from U.S. Pat. Nos. 3,475,225; 3,468,719; 3,499,796; and 3,446,677. These sodium aluminate formulations and their variations as a class of materials are sometimes referred to as β-alumina.

In the past, these β-alumina materials have been fabricated by curing a blank or billet. Slicing or grinding is necessary to reduce the billet to a thinnest possible dimension. The minimum thickness is limited by fabrication technique because of the fragility of the brittle material. But even if a 0.5 to 1.0 mm thick plate can be practically produced by this method, the IR loss is still too high for certain battery operations. Furthermore, a thin ceramic plate presents problems in handling as well as danger of fracturing in service.

SUMMARY OF THE INVENTION

Thin film solid electrolyte structures having high ionic conductance and structural integrity are made by forming a thin film of a β-alumina on one side of a porous β-alumina substrate. The composite structure is made by first compacting a mixture of β-alumina powders and a pore former, such as ammonium carbonate, to form a green substrate sheet. A thin film of ultra-fine β-alumina powder is applied to one side of the green substrate. The composite may be pressed and the completed green composite is sintered then at high temperatures to provide a structurally strong porous substrate sheet having a thin film of dense β-alumina on the surface which is impermeable to the reactants.

BRIEF DESCRIPTION OF THE DRAWING

The drawing is a cross-sectional representation of the present invention showing a dense thin film of β-alumina supported by a porous substrate of β-alumina.

DESCRIPTION OF THE PREFERRED EMBODIMENTS

Solid electrolytes having improved ionic conductance and structural integrity can be made by forming a thin dense film of the solid electrolyte onto a substrate or backing comprising a porous sheet of β-alumina compound. Solid electrolyte thin films their structural support from the porous substrates which may be any practical thickness. Thicknesses of these substrates are not critical, however, practicality dictates that the depth should be thick enough to provide sufficient stiffness and strength to withstand mechanical and thermal stresses. The thin impermeable solid electrolyte film thicknesses generally range from 50 to 1,000 microns.

The substrate material may be either conducting β-alumina or conducting β''-alumina. However, it is permeable that the thin film and the substrate materials are chemically and crystallographically compatible.

Porosity of the alumina substrate should be of the type having interconnected voids. This allows the free passage of the sodium metal, in the case of Na/S cell, through the substrate to contact the β-alumina barrier. The limiting factor for this consideration, of course, is that the substrate must not be so porous as to provide inadequate strength for the β-alumina barrier. The number of and size of voids can be regulated by the amount, type, and size of pore former used. Generally, low temperature decomposing or boiling compounds such as ammonium carbonate, anthracene, naphthalene, or coumarin are excellent pore forming agents because they vaporize rapidly without residues. In the fabrication of the substrate, the pore former comprises between 20 and 50 percent of the total composition by volume.

Fabrication of the substrate comprises mixing finely powdered alumina with the pore former powder. Organic binders such as microcrystalline waxes may be included in the starting powders to facilitate pressing. After the β-alumina powder and the pore former have been homogeneously blended, the mixture is subjected to compaction at pressures ranging between 5,000 and 50,000 psi. These green compact sheets are then coated on one side with a film of β-alumina. Upon subsequent sintering at high temperatures, the pore former is vaporized and driven off along with the organic binder, if present, to form a dense barrier film of β-alumina supported on an alumina substrate having interconnecting voids.

The β-alumina barrier film may be applied in several ways. One method of application comprises simply distributing the dense powder on the surface of the green substrate and pressing the coated substrate prior to sintering. Plasma arc spraying or spraying a slurry of β-alumina onto the surface of a fully sintered porous substrate is an alternate way of preparing the composite. When the composite is produced by slurry spraying, direct deposition of the solid electrolyte film is followed by sintering at 1,500° to 1,800°C to promote densification of the thin film. In a related manner, β-alumina may be applied to the fully sintered porous substrate by either radio frequency ion sputtering or chemical vapor deposition. Both of these processes are well known, and accordingly, further discussion of the processes is not merited here.

Ionic conductive sodium polyaluminates which are designated β-alumina have the formula $Na_2O \cdot xAl_2O_3$ where $x$ is an integer ranging from 8 to 11. Other sodium polyaluminates which are ionic conductive have the formula $Na_2O \cdot 5\text{-}Al_2O_3$ which has been stabilized by the addition of magnesium oxide or lithium oxide in the amount of between 0.5 and 5 percent by weight of the total composition. These stabilized sodium polyaluminates are called β''-alumina.

Thickness of the β-alumina film should be as thin as possible without incurring fissure leaks. An effective means for checking leaks has been to test the film for a leakage rate of less than $10^{-9}$ standard cc of helium per second at a differential pressure of 1 atmosphere.

We claim:
1. A thin film solid electrolyte comprising:
   A. a dense impermeable ionic conductive sodium polyaluminate film supported on
   B. a porous ionic conductive sodium polyaluminate substrate sheet.
2. A thin film electrolyte according to claim 1 wherein:
   said film has a thickness of from 50 to 1,000 microns.
3. A thin film electrolyte according to claim 1 wherein:
   said sodium polyaluminate is represented by the formula $Na_2O \cdot xAl_2O_3$ where $x$ is an integer from 8 to 11.
4. A thin film electrolyte according to claim 1 wherein:
   said sodium polyaluminate has the formula $Na_2O \cdot 5Al_2O_3$ and contains 0.5 to 5 present by weight of a metal oxide selected from the group consisting of magnesium oxide and lithium oxide.
5. A process for making a thin film solid electrolyte comprising:
   A. mixing (i) a powdered ionoic conductive sodium polyaluminate together with (ii) a pore forming compound to form a homogeneous mixture;
   B. compacting said mixture by pressure to sheet form;
   C. coating one side of said sheet with a dense layer of ionic conductive sodium polyaluminate compound;
   D. compacting said coated sheet; and
   E. sintering said coated sheet.
6. A process according to claim 5 wherein:
   said sodium polyaluminate compound is represented by the formula $Na_2O \cdot xAl_2O_3$ where $x$ is an integer from 8 to 11.
7. A process according to claim 5 wherein:
   said sodium polyaluminate has the formula $Na_2O \cdot 5Al_2O_3$ and contains 0.5 to 5.0 percent by weight of a metal oxide selected from the group consisting of magnesium oxide and lithium oxide.
8. A process according to claim 5 wherein:
   said pore forming compound is selected from the group consisting of naphthalene, ammonium carbonate, anthracene, or coumarin.
9. A process according to claim 5 wherein:
   an organic binder is mixed with said powdered polyaluminate.
10. A process for making a thin film solid electrolyte comprising:
    A. mixing (i) a powdered ionic conductive sodium polyaluminate together with (ii) a pore forming compound to form a homogeneous mixture
    B. compacting said mixture by pressure to sheet form;
    C. sintering said compacted sheet; and
    D. spraying by plasma arc a layer of dense ionic conductive sodium polyaluminate on one side of said sheet.
11. A process according to claim 10 wherein:
    said sodium polyaluminate compound is represented by the formula $Na_2O \cdot xAl_2O_3$ where $x$ is an integer from 8 to 11.
12. A process according to claim 10 wherein:
    said sodium polyaluminate has the formula $Na_2O \cdot 5Al_2O_3$ and containing 0.5 to 5.0 percent by weight of a metal oxide selected from the group consisting of magnesium oxide and lithium oxide.
13. A process according to claim 10 wherein:
    said pore forming compound is selected from the group consisting of naphthalene, ammonium carbonate, anthracene, or coumarin.
14. A process according to claim 10 wherein:
    an organic binder is mixed with said powdered polyaluminate.
15. A process for making a thin film solid electrolyte comprising:
    A. mixing (i) a powdered ionic conductive sodium polyaluminate together with (ii) a pore forming compound to form a homogeneous mixture;
    B. compacting said mixture by pressure to sheet form;
    C. sintering said compacted sheet;
    D. coating a slurry of an ionic conductive sodium polyaluminate on one side of said sheet; and
    E. sintering said coated sheet.
16. A process according to claim 15 wherein:
    said sodium polyaluminate compound is represented by the formula $Na_2O \cdot xAl_2O_3$ where $x$ is an integer from 8 to 11.
17. A process according to claim 15 wherein:
    said sodium polyaluminate has the formula $Na_2O \cdot 5Al_2O_3$ and contains 0.5 to 5.0 percent by weight of a metal oxide selected from the group consisting of magnesium oxide and lithium oxide.
18. A process according to claim 15 wherein:
    said pore forming compound is selected from the group consisting of naphthalene, ammonium carbonate, anthracene, or coumarin.
19. A process according to claim 15 wherein: an organic binder is mixed with said powdered polyaluminate.

* * * * *